US006959089B1

(12) United States Patent
Sprunk

(10) Patent No.: US 6,959,089 B1
(45) Date of Patent: Oct. 25, 2005

(54) METHOD AND APPARATUS FOR SECURE TRANSMISSION OF DATA

(75) Inventor: Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 925 days.

(21) Appl. No.: 09/697,656

(22) Filed: Oct. 26, 2000

Related U.S. Application Data

(60) Provisional application No. 60/196,009, filed on Apr. 7, 2000.

(51) Int. Cl.[7] .............................................. H04N 7/167

(52) U.S. Cl. ................................................... 380/239

(58) Field of Search ........................ 380/110, 205, 239, 380/259, 21, 30, 258, 211; 713/150, 159, 713/168, 170, 175, 185, 201, 163

(56) References Cited

U.S. PATENT DOCUMENTS

| 5,729,608 A | * | 3/1998 | Janson et al. ................ 713/171 |
| 6,385,317 B1 | * | 5/2002 | Rix et al. ..................... 380/258 |
| 6,424,717 B1 | * | 7/2002 | Pinder et al. ................ 380/239 |

OTHER PUBLICATIONS

Menezes, Oorschott, Vanstone: Handbook of Applied Cyptography, CRC Press Series on Discrete Mathematics and its Applications, pp. 400-402 and 497-499; U.S. Boca Raton, FL, CRC Press, 1997, XP002171432, ISBN: 0-8493-8523-7.

Eskicioglu A.M., Delp, E.J., An Overview of Multimedia Content Protection in Consumer Electronic Devices, pp. 681-699; Signal Processing Image communication, Elsevier Science Publishers, Amsterdam, NL, vol. 16, No. 7, Apr. 2001.

* cited by examiner

Primary Examiner—Gregory Morse
Assistant Examiner—Ellen C Tran
(74) Attorney, Agent, or Firm—Townsend and Townsend and Crew LLP

(57) ABSTRACT

An apparatus and method are utilized for transmitting data across an interface between a sender and a receiver. The sender and receiver can be provided with a shared key, a receiver_key and a sender_key. A payload message can be combined with the keys to generate a unique message for transmission across the interface. The payload message can be authenticated utilizing the same input and the same algorithm on the receiving end of the transmission. The resulting confirmatory payload message can be utilized with the authenticating payload message to authenticate the payload message.

40 Claims, 4 Drawing Sheets

METHOD AND APPARATUS FOR SECURE TRANSMISSION OF DATA

CROSS-REFERENCES TO RELATED APPLICATIONS

This application claims the benefit of U.S. Application No. 60/196,009 entitled "Method and Apparatus for Secure Transmission of Data" filed on Apr. 7, 2000.

BACKGROUND

This invention relates generally to the secure transmission of data. More specifically, the invention relates to a system for establishing a secure exchange of information between a sending unit and a receiving unit.

In the transmission of data between a sender and a receiver, there is a need for a system that allows a secure transaction to take place when the sending unit and the receiving unit have not established a secure channel through which data can be transmitted. It is often difficult for a separate secure channel to exist. Hence, there is a need for a system that permits a secure exchange of information between the sending unit and the receiving unit when such a separate secure channel does not exist.

In one situation, for example, a sending unit will need to send administrative information to the receiving unit. This administrative information may not need to be encrypted. However, it will likely need to be authenticated. Thus, there is a need to ensure that the administrative information that was sent was not corrupted during its transmission through the transmission channel, for example, by an attacker. An attacker wishing to corrupt the transmitted message could stage a "man in the middle" attack on the transmission in order to corrupt the data. Thus, there is a need for a system that prevents such corruption.

SUMMARY

The present invention provides a method and apparatus for transmitting data across an interface between a sending unit and a receiving unit. The system is capable of providing the sender with a shared key; providing the receiver with the shared key; providing the receiver with a receiver_key; conveying the receiver_key to the sender; providing the sender with a sender_key; conveying the sender_key to the receiver; providing a payload message; generating an authenticating payload message utilizing at least the shared key, receiver_key, and sender_key; generating a confirmatory authenticating payload message; and utilizing the authenticating payload message and confirmatory authenticating payload message to authenticate the payload message. A transaction identifier can also be used with the shared key, receiver_key, and sender_key, to generate the authenticating payload message and confirmatory authenticating payload message.

Other and further features of the invention will be apparent to those skilled in the art from a consideration of this specification taken in conjunction with the accompanying drawings wherein certain methods and apparatuses for practicing the invention are illustrated. It should be understood that the invention is not limited to the details disclosed but includes all variations and modifications that fall within the spirit of the invention and the scope of the appended claims.

DESCRIPTION OF THE SPECIFIC EMBODIMENTS

The method for transmitting data across an interface can generally be stated as establishing an interface between a sender and a receiver, and providing the sender and the receiver with a shared key. The receiver is also provided with a receiver_key and the sender is also provided with a sender_key. The receiver and sender exchange their respective keys; thus, the sender obtains the receiver_key and the receiver obtains the sender_key. A payload message, namely, the message for which authentication is required, is then provided. An authenticating payload message is generated utilizing at least the shared key, the receiver_key, and the sender_key. A confirmatory authenticating payload message is also generated. Finally, the authenticating payload message and the confirmatory authenticating payload message are utilized to authenticate the original payload message.

Figure 1A:
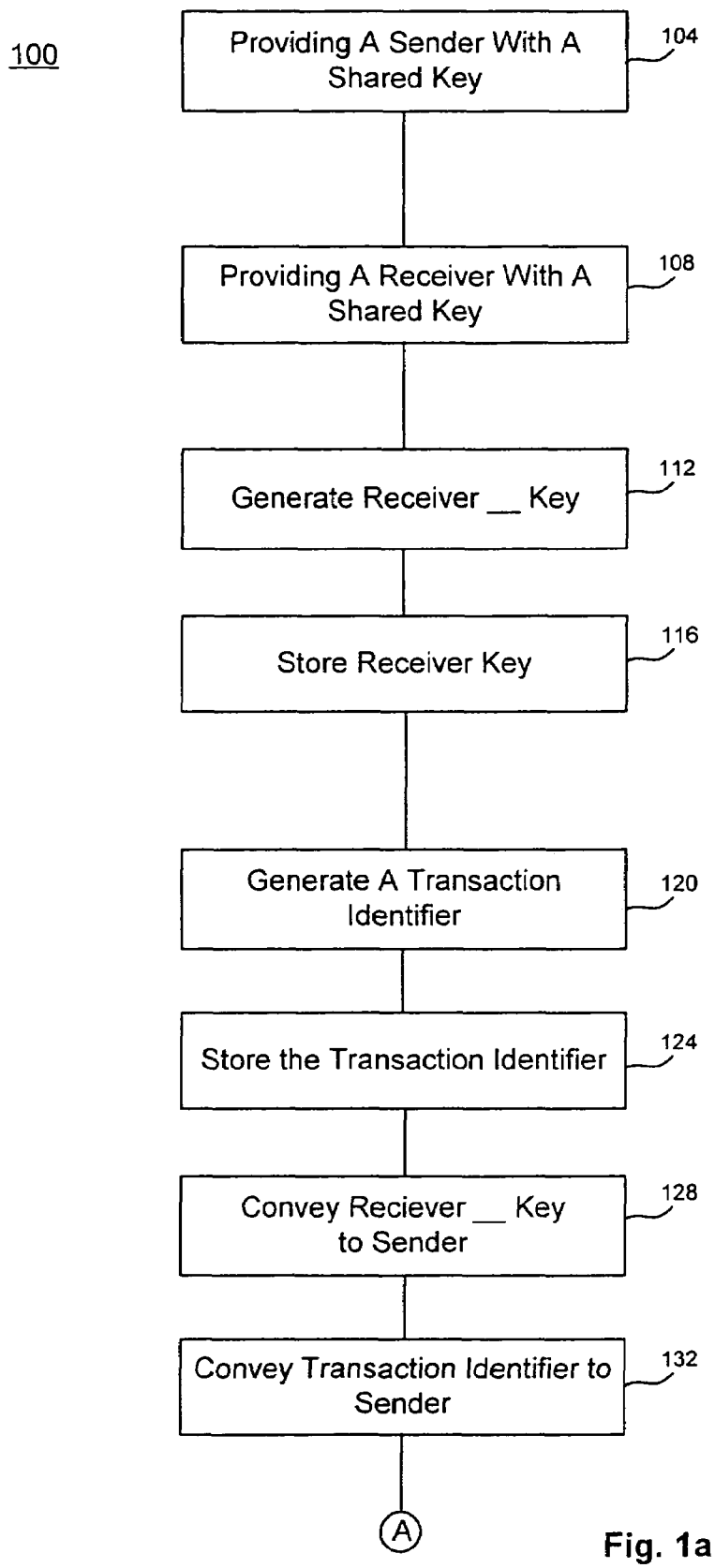
FIGS. 1a, 1b, and 1c illustrate a flow diagram for implementing one embodiment of the invention.
Figure 1B:
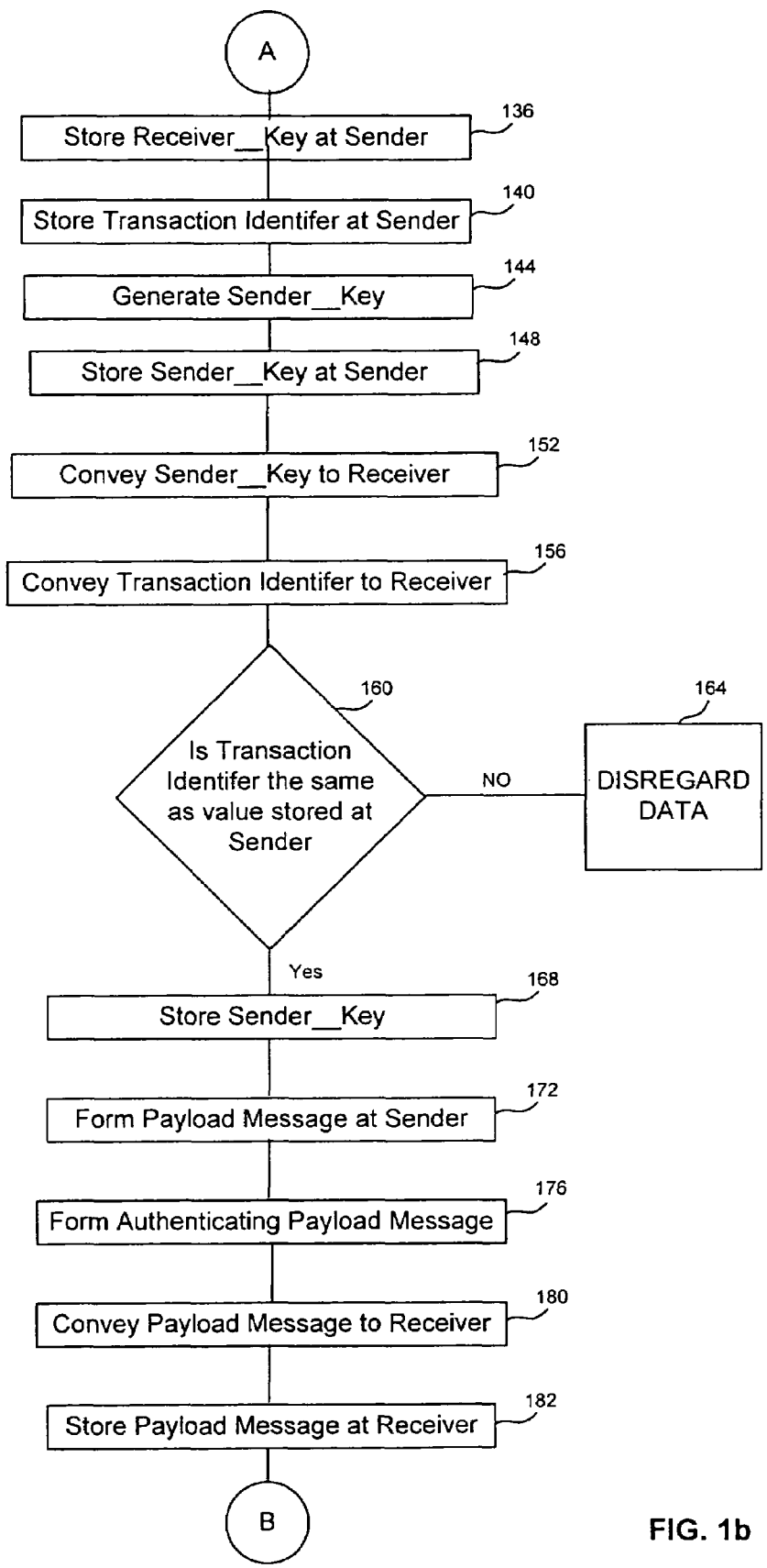
Figure 1C:
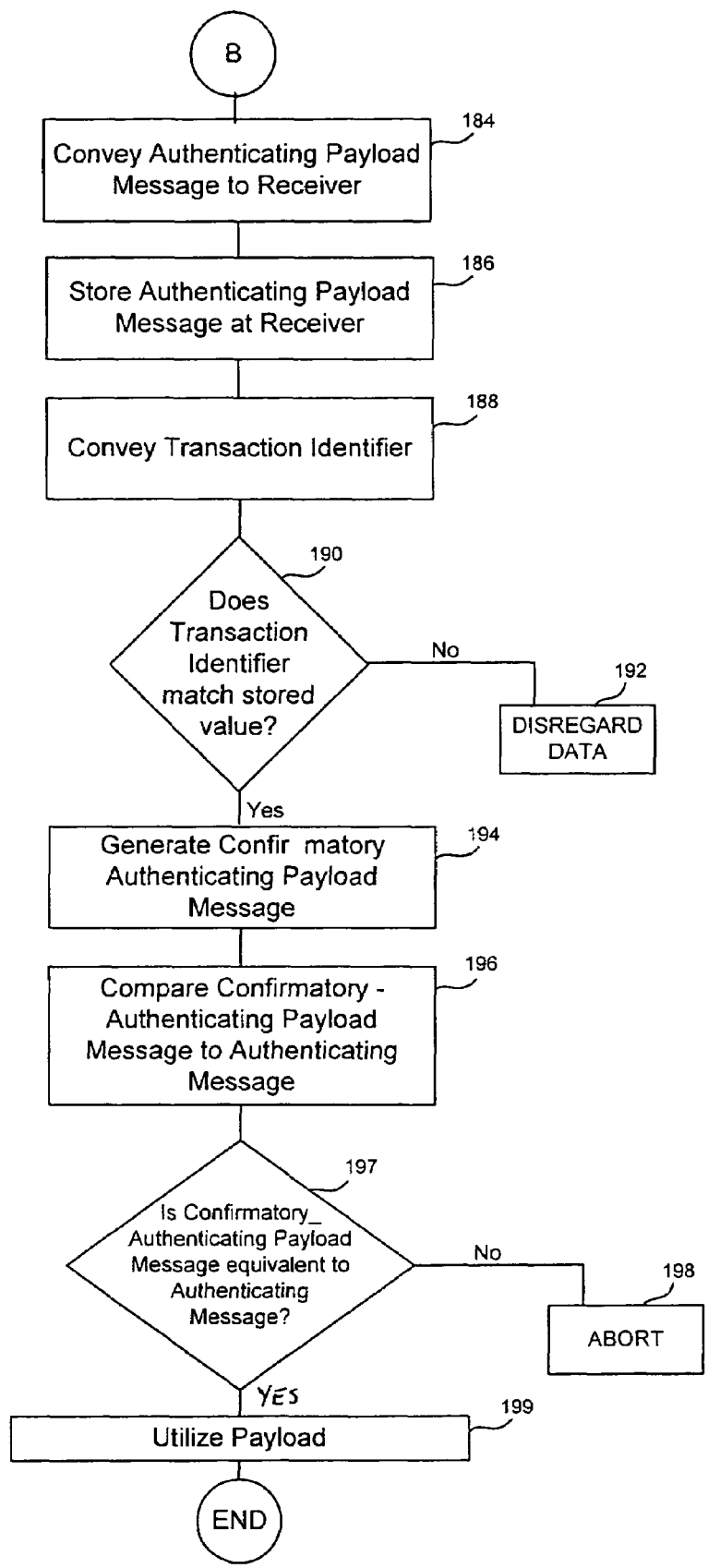

Referring now to the flowchart 100 in FIGS. 1a, 1b, and 1c, a method for implementing one embodiment of the invention can be seen. In block 104, a sender is provided with a shared key. A "sender" is considered to be a sending unit, such as a transmitter, that broadcasts or sends signals, such as a binary stream of data, across a communication channel. The shared key will often be a secret key. Namely, a "shared key" is a key possessed by both the sender and receiver for use in establishing an authenticated transaction; however, it is not necessarily limited to such a use. For example, it could be a key exchanged between the sender and receiver as part of another process, such as the encryption/decryption process. Thus, the sender and receiver will each have a copy of the shared key. The receiver having the shared key is reflected in block 108. A "receiver" is considered to be a receiving unit that is capable of receiving signals sent by the sending unit across the communication channel. In block 112, a receiver_key is generated. A "receiver_key" is a key generated on the receiver side of the interface. One example of a receiver_key would be a "nonce". A nonce is a generated number e.g., a randomly generated number, that is utilized only once in a system. Nonces are useful in that they can be used to prevent a "replay" attack. Thus, if a nonce is used once between a receiver and a sender, the receiver and sender will recognize a replay attack if that same number used for the nonce is used again. In block 116, the receiver_key is stored, for example, in a memory at the receiver. If nonces are used for the receiver_key and sender_key, they can be referred to as the receiver_nonce and sender_nonce, respectively. Furthermore, if the nonce is necessarily randomly generated, such a receiver_key could be referred to as a receiver_random_number_nonce.

In block 120, a transaction identifier is generated. The transaction identifier identifies the exchange of information process between the sender and the receiver. Thus, the sender and receiver couple the transaction identifier with information exchanged between the sender and receiver to identify the purpose of the information being exchanged. In the particular process of interest, the transaction identifier will identify the ongoing authentication transaction. Thus, in block 124, after the transaction identifier is generated, it can be stored, for example, at the receiver. In block 128, the previously generated receiver_key is conveyed to the sender. Preferably, this conveyance occurs by transmitting the receiver_key along with the transaction identifier across the interface to the sender, as illustrated by blocks 128 and 132. In this fashion, the transaction identifier can be coupled with the receiver_key data such that the sender will recognize the purpose of the transmission.

In FIG. 1b, block 136, the receiver_key which has been sent or conveyed to the sender is stored at the sender. In block 140, the transaction identifier generated at the receiver is stored at the sender, as well.

The process is generally repeated in the generation of a sender_key as shown by blocks 144, 148, 152, and 156. A "sender_key" is a key generated on the sender side of the interface. Thus, a sender_key is generated as shown in 144. Again, the sender_key can be a random number nonce in order to prevent a replay attack in the exchange of the sender_key. In block 148, the sender_key is stored at the sender. Then, the sender_key can be conveyed to the receiver as shown in 152. As mentioned earlier, the exchange of information between the sender and receiver can be accomplished through the use of a transaction identifier which is attached to the information being exchanged between the sender and receiver. This is shown by block 156.

In block 160, the value of the transaction identifier conveyed with the sender_key is compared to the stored value of the transaction identifier that was sent with the receiver_key. If the comparison confirms that the transaction identifier is the same as the stored value, then the process continues. However, if the transaction identifier has changed, then the data is disregarded as part of the authentication procedure. This is illustrated by block 164. As illustrated in block 168, the sender_key can then be stored at the receiver in the memory of the receiver if the transaction identifier is recognized.

Block 172 demonstrates the formation of the payload message. The payload message is the information of interest which is to be sent by the sender and authenticated. Thus, it is the information which necessitates the authentication process. An example of a payload message is a two bit packet of information that indicates four different levels of copy protection for an MPEG encoded data stream. Authentication refers to the process whereby a user or information source proves that it is who it claims to be. Thus, authentication allows information such as the payload message to be confirmed as to its origin.

In block 176, an authenticating payload message is formed. The authenticating payload message is a message which is used e.g., by the receiver, to authenticate the payload message sent by the sender. The authenticating payload message is formed utilizing data values possessed by both the sender and receiver. For example, the authenticating payload message can be formed by utilizing the shared key, the sender_key, and the receiver_key. Alternatively, the transaction identifier and/or additional data values can also be utilized to generate the authenticating payload message. By appending these various keys and/or identifiers and performing a hash algorithm on the appended set of data, a unique authenticating payload message is derived. It is not critical to utilize any particular algorithm to hash the fields of data. It is envisioned that any algorithm which creates a unique result based on a unique input of data could be utilized.

The payload message is conveyed to the receiver from the sender across the interface as illustrated in block 180. An "interface" is considered to be the physical point of demarcation between two devices. Thus, there is a receiver side of the interface and a sender side of the interface. This payload message is stored at the receiver in block 182. In FIG. 1c, block 184, the authenticating payload message is conveyed to the receiver. The authenticating payload message is then stored at the receiver as shown in block 186. In addition, the transaction identifier can be conveyed along with the authenticating payload message as shown in block 188. Once again, a comparison is made between the value of the transaction identifier which was stored by the receiver and the value of the transaction identifier conveyed with the authenticating payload message as shown in block 190. If the transaction identifier does not match the value that was sent earlier, the authenticating payload message is disregarded as shown in block 192.

In block 194, a confirmatory authenticating payload message is generated. The confirmatory authenticating payload message is generated on the receiver side of the interface utilizing the same information or data values that were utilized in the generation of the authenticating payload message. Thus, for example, the confirmatory authenticating payload message is generated by the receiver utilizing the shared key, receiver_key, and sender_key. Or, if the transaction identifier was used in generation of the authenticating payload message, it too would be utilized to generate the confirmatory authenticating payload message. The same algorithm would be utilized to generate the confirmatory authenticating payload message as was used to generate the authenticating payload message. Thus, the confirmatory authenticating payload message which utilize the same information as the authenticating payload message should be equivalent to the authenticating payload message. In order to determine whether they are equivalent, the confirmatory authenticating payload message is compared to the authenticating payload message, as shown in block 196. Such a test is made in block 197 to determine the equivalency of the two values. If the two values are not equivalent, then the process is aborted as shown in block 198. However, if the confirmatory authenticating payload message is equivalent to the authenticating payload message, then authentication is complete or is achieved and the payload information can be utilized, as shown in block 199.

Figure 2:
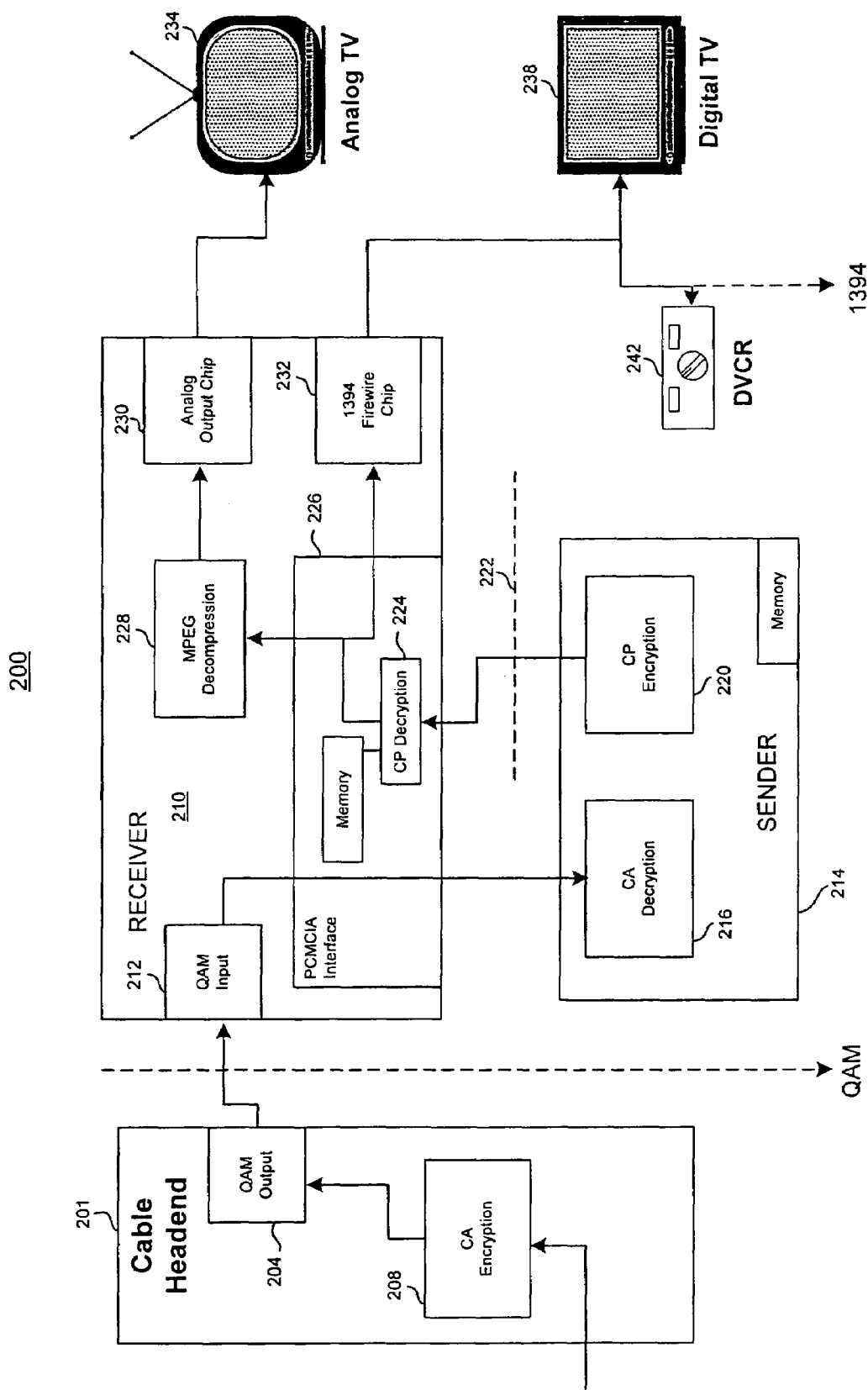
FIG. 2 illustrates a circuit for implementing one embodiment of the invention.

FIG. 2 demonstrates a practical example of the method demonstrated in FIGS. 1a, 1b, and 1c. In the cable television industry, set top boxes have been utilized that contain both the set top components and the cable system conditional access system components integrated into stand alone chips. However, the 1996 Cable Act and 1998 FCC Rule and Order require that navigation devices be open to competition through the separation of security functions into a separate module. Thus, there is now a channel between the conditional access system of the set top box and the remainder of the set top box which is open to attack by those desiring to obtain the content of the cable transmission. FIG. 2 shows an implementation that can utilize the method described in FIGS. 1a, 1b, and 1c. In circuit 200, the cable headend 201 obtains an incoming signal which the cable access encryption system 208 encrypts. The encrypted signal is then sent to a quadrature amplitude modulation output 204. The QAM output signal is transmitted to a QAM input 212 at the set top box receiver 210. Once received, the signal is transmitted across the interface 222 to the sender 214. At the sender, the conditional access information is decrypted in block 216. Sender 214 is also comprised of a copy protection encryption unit 220 and memory 222. One aspect of the conditional access information is copy protection information. For example, a cable headend can indicate the level of copying allowed for a particular cable program. Thus, if the program is highly valuable, it may have copy protection that indicates that it is not allowed to be copied at the set top box. Alternatively, if the program is not valuable, the copy protection information could indicate that the set top box is free to make multiple copies of the program. As yet another alternative, the copy protection information may indicate that one additional copy is allowed to be produced by the set top box. Thus, this facilitates distributing the program to more than one device from the set top box. Therefore, the copy protection information for a program could be embodied in as few as one or two bits.

The copy protection information, also known as CCI information, needs to be conveyed across the interface 222 to the set top box. The interface between the sender 214 and receiver 210 is exposed, thus a level of authentication is required in sending the CCI information. An attacker might try to alter the CCI information so as to allow the set top box to produce multiple copies of a valuable program. Thus, the CCI information should be authenticated to ensure that an attacker does not corrupt the CCI information into a lower level of protection. The method in flowchart 100 described above can be utilized to accomplish this task. Namely, the sender and receiver will share an encryption/decryption key from an earlier transaction in which such a key was stored at both the receiver and the sender. Thus, they each have a copy of the shared key. In addition, as described above, they can exchange nonces so as to prevent a replay attack. Then, the CCI information can be utilized as the payload message and a hash algorithm can be implemented utilizing the shared key, the receiver_key, and the sender_key. Once the payload data is authenticated, the copy protection information is decrypted at the receiver 210 in block 224. With the copy protection information decrypted, the program signal can be distributed to the end user devices. Thus, in block 228, the decompression of the MPEG signal can be accomplished and output to the various transducer chips. For example, to produce a signal compatible with an analog TV, an analog output chip 230 could be utilized for end user device 234. Alternatively, if a digital TV 238 is the end user device, the MPEG signal could be sent to a 1394 firewire chip 232. Such would be the case as well for a digital VCR 242, shown in FIG. 2.

While various embodiments of the invention have been described as methods or apparatus for implementing the invention. It should be understood that the invention can be implemented through code coupled to a computer, e.g., code resident on a computer or accessible by the computer. For example, software could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that the embodiments expressed above also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures and acts recited herein can be recited as means for performing a function or steps for performing a function, respectively. Therefore, it should be understood that such language is entitled to cover all such structures or acts disclosed within this specification and their equivalents, including the matter incorporated by reference.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method for transmitting data across an interface between a sender and a receiver, comprising:
   providing said sender with a shared key;
   providing said receiver with said shared key;
   providing said receiver with a receiver_key by generating a nonce for said receiver_key at said receiver;
   conveying said receiver_key to said sender;
   providing said sender with a sender_key by generating a nonce for said sender_key at said sender;
   conveying said sender_key to said receiver;
   providing a payload message;
   generating an authenticating payload message utilizing at least said shared key, said receiver_key and said sender_key;
   generating a confirmatory authenticating payload message;
   utilizing said authenticating payload message and said confirmatory payload message to authenticate said payload message.

2. The method as described in claim 1 wherein said providing said receiver with said receiver_key comprises generating said receiver_key at said receiver.

3. The method as described in claim 2 wherein said conveying said receiver_key to said sender comprises transmitting said receiver_key across said interface.

4. The method as described in claim 1 wherein said providing said sender with said sender_key comprises generating said sender_key at said sender.

5. The method as described in claim 4 wherein said conveying said sender_key to said receiver comprises transmitting said sender_key across said interface.

6. The method as described in claim 1 and further comprising conveying a transaction identifier from said receiver to said sender along with said receiver_key.

7. The method as described in claim 6 wherein said generating an authenticating payload message comprises utilizing said transaction identifier.

8. The method as described in claim 1 and further comprising conveying a transaction identifier from said sender to said receiver along with said sender_key.

9. The method as described in claim 1 and further comprising confirming a transaction identifier when exchanging said sender_key and said receiver_key.

10. The method as described in claim 1 and further comprising conveying said payload message from said sender across said interface to said receiver.

11. The method as described in claim 1 and further comprising conveying said authenticating payload message from said sender across said interface to said receiver.

12. The method as described in claim 1 wherein said generating said authenticating payload message comprises generating said authenticating payload message on the sender side of said interface.

13. The method as described in claim 1 and further comprising utilizing said transaction identifier to generate said authenticating payload message.

14. The method as described in claim 1 wherein said generating a confirmatory authenticating payload message comprises generating said confirmatory authenticating payload message on the receiver side of said interface.

15. The method as described in claim 1 wherein said generating said confirmatory authenticating payload message comprises utilizing at least said shared key, said sender_key, and said receiver_key.

16. The method as described in claim 15 and further comprising utilizing at least said transaction identifier to generate said authenticating payload message.

17. The method as described in claim 1 wherein said utilizing said authenticating payload message comprises comparing said authenticating payload message to said confirmatory authenticating payload message.

18. The method as described in claim 17 and further comprising determining that said confirmatory authenticating payload message is equivalent to said authenticating payload message.

19. An apparatus for transmitting data across an interface between a sender and a receiver, comprising:
    code operable to provide said sender with a shared key;
    code operable to provide said receiver with said shared key;
    code operable to provide said receiver with a receiver_key, wherein said receiver_key is a nonce generated at said receiver;
    code operable to convey said receiver_key to said sender;
    code operable to provide said sender with a sender_key, wherein said sender_key is a nonce generated at said sender;
    code operable to convey said sender_key to said receiver;
    code operable to provide a payload message;
    code operable to generate an authenticating payload message utilizing at least said shared key, said receiver_key and said sender_key;
    code operable to generate a confirmatory authenticating payload message;
    code operable to utilize said authenticating payload message and said confirmatory authenticating payload message to authenticate said payload message.

20. The apparatus as described in claim 19 wherein said code operable to provide said receiver_key comprises code operable to generate said receiver_key at said receiver.

21. The apparatus as described in claim 20 and further comprising code operable to transmit said receiver_key across said interface.

22. The apparatus as described in claim 19 wherein said code operable to provide said sender with said sender_key comprises code operable to generate said sender_key at said sender.

23. The apparatus as described in claim 22 wherein said code operable to convey said sender_key comprises code operable to transmit said sender_key across said interface.

24. The apparatus as described in claim 19 and further comprising code operable to convey a transaction identifier from said receiver to said sender with said receiver_key.

25. The apparatus as described in claim 24 wherein said code operable to generate an authenticating payload message comprises code operable to utilize said transaction identifier to generate said authenticating payload message.

26. The apparatus as described in claim 19 and further comprising code operable to convey a transaction identifier from said sender to said receiver along with said sender_key.

27. The apparatus as described in claim 19 and further comprising code operable to confirm a transaction identifier in exchanging said sender_key with said receiver_key.

28. The apparatus as described in claim 19 and further comprising code operable to convey said payload message from said sender across said interface to said receiver.

29. The apparatus as described in claim 19 and further comprising code operable to convey said authenticating payload message from said sender across said interface to said receiver.

30. The apparatus as described in claim 19 wherein said code operable to generate an authenticating payload message comprises code operable to generate said authenticating payload message on the sender side of the interface.

31. The apparatus as described in claim 19 and further comprising code operable to utilize said transaction identifier to generate said authenticating payload message.

32. The apparatus as described in claim 19 wherein said code operable to generate a confirmatory authenticating payload message comprises code operable to generate said confirmatory authenticating payload message on the receiver side of said interface.

33. The apparatus as described in claim 19 wherein said code operable to generate said confirmatory authenticating payload message comprises code operable to utilize at least said shared key, said sender_key, and said receiver_key.

34. The apparatus as described in claim 33 and further comprising code operable to utilize said transaction identifier to generate said authenticating payload message.

35. The apparatus as described in claim 19 wherein said code operable to utilize said authenticating payload message and said confirmatory authenticating payload message comprises code operable to compare said authenticating payload message with said confirmatory authenticating payload message.

36. The apparatus as described in claim 35 and further comprising code operable to determine that said confirmatory authenticating payload message is equivalent to said authenticating payload message.

37. A method for transmitting data between a sender and a receiver, comprising:
    providing said sender with a shared key;
    providing said receiver with said shared key;
    generating a receiver_nonce for said receiver at said receiver;
    generating a transaction identifier for identifying a transaction between said receiver and said sender;
    transmitting said receiver_nonce and said transaction identifier from said receiver to said sender;
    generating a sender_nonce for said sender at said sender;
    transmitting said sender_nonce and said transaction identifier from said sender to said receiver;
    forming a payload message;
    forming an authenticating message utilizing at least said shared key, said sender_nonce, said receiver_nonce and said transaction identifier;
    transmitting said payload message, said authenticating message, and said transaction identifier from said sender to said receiver;

utilizing said authenticating message to authenticate said payload message.

38. An apparatus for transmitting data between a sender and a receiver, comprising:
- code operable to provide said sender with a shared key;
- code operable to provide said receiver with said shared key;
- code operable to generate a receiver_nonce for said receiver at said receiver;
- code operable to generate a transaction identifier for identifying a transaction between said receiver and said sender;
- code operable to transmit said receiver_nonce and said transaction identifier from said receiver to said sender;
- code operable to generate a sender_nonce for said sender at said sender;
- code operable to transmit said sender_nonce and said transaction identifier from said sender to said receiver;
- code operable to form a payload message;
- code operable to form an authenticating message utilizing at least said shared key, said sender nonce, said receiver_nonce and said transaction identifier;
- code operable to transmit said payload message, said authenticating message, and said transaction identifier from said sender to said receiver;
- code operable to utilize said authenticating message to authenticate said payload message.

39. A method for securely transmitting data across an interface between a sender and a receiver, comprising:
- providing said sender with a secret key;
- providing said receiver with said secret key;
- generating a receiver_random_number_nonce at said receiver;
- storing said receiver_random_number_nonce at said receiver;
- generating at said receiver a transaction identifier for identifying an authentication transaction;
- storing said transaction identifier at said receiver;
- transmitting said receiver_random_number_nonce and said transaction identifier from said receiver to said sender;
- storing said receiver_random_number_nonce at said sender;
- storing said transaction identifier at said sender;
- generating a sender_random_number_nonce at said sender;
- storing said sender_random_number_nonce at said sender;
- transmitting said sender_random_number_nonce and said transaction identifier from said sender to said receiver;
- storing said sender_random_number_nonce at said receiver;
- forming a payload message at said sender;
- forming at said sender an authenticating message utilizing said payload message, said secret key, said sender_random_number_nonce, said;
- receiver_random_number_nonce and said transaction identifier;
- transmitting said payload message, said authenticating message, and said transaction identifier from said sender to said receiver;
- storing said payload message at said receiver;
- storing said authenticating message at said receiver;
- confirming that the value of the transaction identifier is equivalent to the value of the transaction identifier transmitted previously;
- forming at said receiver a confirmatory authenticating payload message utilizing said payload message, said secret key, said sender_random_number_nonce, said receiver_random_number_nonce and said transaction identifier;
- comparing said confirmatory authenticating payload message with said authenticating message;
- determining that said payload message is authentic based on said confirmatory authenticating payload message being equivalent to said authenticating message; and
- utilizing said payload message.

40. A system for securely transmitting data across an interface between a sender and a receiver, comprising:
- a sender storing a secret key;
- a receiver storing said secret key;
- code for generating a receiver_random_number_nonce at said receiver;
- a first memory coupled to said receiver for storing said receiver_random_number_nonce and for storing said transaction identifier;
- code for generating at said receiver a transaction identifier for identifying said receiver_random_number_nonce;
- code for transmitting said receiver_random_number_nonce and said transaction identifier from said receiver to said sender;
- a second memory coupled to said sender for storing said receiver_random_number_nonce and said transaction identifier;
- code for generating a sender_random_number_nonce at said sender;
- wherein said memory coupled to said sender is operable to store said sender_random_number_nonce;
- code for transmitting said sender_random_number_nonce and said transaction identifier from said sender to said receiver;
- wherein said first memory is operable to store said sender_random_number_nonce;
- code for forming a payload message at said sender;
- code for forming at said sender an authenticating message utilizing said payload message, said secret key, said sender_random_number_nonce, said receiver_random_number_nonce and said transaction identifier;
- code for transmitting said payload message, said authenticating message, and said transaction identifier from said sender to said receiver;
- wherein said first memory is operable to store said payload message and said authenticating message;
- code for confirming that the value of the transaction identifier is equivalent to the value of the transaction identifier transmitted previously;
- code for forming at said receiver a confirmatory authenticating payload message utilizing said payload message, said secret key, said sender_random_number_nonce, said receiver_random_number_nonce and said transaction identifier;
- code for comparing said confirmatory authenticating payload message with said authenticating message; and
- code for determining that said payload message is authentic based on said confirmatory authenticating payload message being equivalent to said authenticating message.

* * * * *